United States Patent [19]

Yamanouchi et al.

[11] Patent Number: 4,861,852

[45] Date of Patent: Aug. 29, 1989

[54] POLYMER MORDANT

[75] Inventors: Junichi Yamanouchi; Masaharu Toriuchi, both of Kanagawa, Japan

[73] Assignee: Fuji Photo Film Co., Ltd., Kanagawa, Japan

[21] Appl. No.: 883,661

[22] Filed: Jul. 9, 1986

[30] Foreign Application Priority Data

Jul. 9, 1985 [JP] Japan ............................... 60-150810

[51] Int. Cl.[4] ............................................ C08F 226/06

[52] U.S. Cl. .................................... 526/263; 526/260; 526/287; 526/292.2; 526/307; 526/310

[58] Field of Search .................. 526/292.2, 287, 292.9, 526/292.1, 263, 312, 310, 326

[56] References Cited

U.S. PATENT DOCUMENTS

| | | | |
|---|---|---|---|
| 3,758,445 | 9/1973 | Cohen | 430/213 |
| 4,463,080 | 7/1984 | Snow | 430/213 |

*Primary Examiner*—Christopher Henderson
*Attorney, Agent, or Firm*—Sughrue, Mion, Zinn, Macpeak & Seas

[57] ABSTRACT

A novel polymer mordant which is represented by the general formula (I):

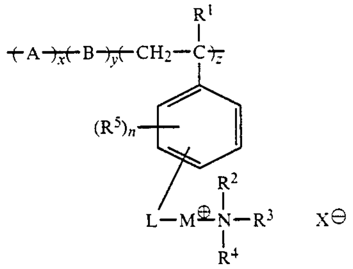

(I)

wherein A represents a monomer unit produced by copolymerization of copolymerizable monomers having at least two ethylenically unsaturated groups; B represents a monomer unit produced by copolymerization of copolymerizable ethylenically unsaturated monomers; $R^1$ represents a hydrogen atom or a $C_{1-6}$ alkyl group; L represents $-CH_2O-$, $-CH_2N(R^6)-$,

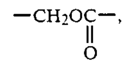
, or
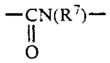

in which $R^6$ and $R^7$ each represents a hydrogen atom or an alkyl group; M represents a $C_{1-12}$ divalent group; $R^2$, $R^3$ and $R^4$, which may be the same or different, each represents a $C_{1-20}$ alkyl group or a $C_{7-20}$ aralkyl group and at least two of $R^2$, $R^3$ and $R^4$ may be connected to each other to form a cyclic structure together with the nitrogen atom; $R^5$ represents a $C_{1-20}$ alkyl group, a substituted $C_{1-20}$ alkyl group, a $C_{1-20}$ alkoxy group, a $C_{1-20}$ acylamino group, or a halogen atom; $X^\ominus$ represents an anion; x represents 10 to 80 mol %; y represents 0 to 90 mol %; z represents 10 to 100 mol %; and n represents an integer of 0, 1, or 2.

5 Claims, No Drawings

POLYMER MORDANT

FIELD OF THE INVENTION

The present invention relates to a novel polymer useful as a mordant suitable for photographic dyes and a silver halide photographic material containing the same.

BACKGROUND OF THE INVENTION

It is well known in the photographic art that various polymers are used as mordants to prevent dye transfer. Such polymer mordants are disclosed in U.S. Pat. Nos. 3,898,088, 3,958,995, 4,131,469, and 4,147,548, West German patent application (OLS) No. 2,941,818, and Japanese patent application (OPI) Nos. 30328/78 and 17352/81 (the term "OPI" as used herein means an "unexamined published application").

Polymer mordants which suffer less from chemical change or decomposition of the dye image due to light are disclosed in British Pat. Nos. 2,011,912 and 2,093,041, and U.S. Pat. No. 4,282,305. However, these polymer mordants are disadvantageous in that due to their poor mordancy a prolonged period of time is required for dye transfer. This is a fatal defect in instant color photography applications.

These polymer mordants are also disadvantageous in that due to their poor mordancy dyes are released and then diffuse into the photographic material, deteriorating image sharpness.

On the other hand, U.S. Pat. Nos. 3,958,995 and 4,193,800 disclose water-insolubilized polymer latex mordants. Such polymer latex mordants are excellent at retaining dyes and are extremely less apt to diffuse into the material. However, it has been found that when a photographic print containing a dye mordanted by such a mordant is irradiated with light from a fluorescent lamp or mercury lamp or sunlight, the dye suffers from a chemical change or decomposition. When such chemical change or decomposition causes a decrease in the density of dye image, the picture quality of the photographic print becomes remarkably poor.

SUMMARY OF THE INVENTION

It is therefore an object of the present invention to provide a polymer mordant excellent in mordancy which suffers less from chemical change or decomposition of dye image due to irradiation with light.

It is another object of the present invention to provide a color diffusion transfer photographic element which is excellent at retaining dyes and which has excellent dye image sharpness.

It is a further object of the present invention to provide a color diffusion transfer photographic element (especially the peel-apart type) which provides a transferred dye image in a short period of time after imagewise exposure.

These and other objects of the present invention will become more apparent from the following description and examples.

As a result of intensive studies, we have found that the above first object of the present invention can be accomplished by a polymer mordant of the general formula (I) and the latter two objects of the present invention can be accomplished by a photographic element comprising a support having provided thereon at least one light-sensitive silver halide emulsion layer and at least one layer containing a dispersion (preferably a polymer latex) of a polymer mordant of the general formula (I).

Formula (I)

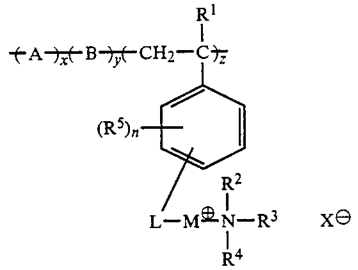

(I)

wherein A represents a monomer unit produced by copolymerization of copolymerizable monomers having at least two ethylenically unsaturated groups; B represents a monomer unit produced by copolymerization of copolymerizable ethylenically unsaturated monomers; $R^1$ represents a hydrogen atom or a $C_{1-6}$ alkyl group; L represents $-CH_2O-$, $-CH_2N(R^6)-$,

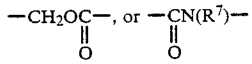

in which $R^6$ and $R^7$ each represents a hydrogen atom or an alkyl group; M represents a $C_{1-12}$ divalent group; $R^2$, $R^3$ and $R^4$, which may be the same or different, each represents a $C_{1-20}$ alkyl group or a $C_{7-20}$ aralkyl group and at least two of $R^2$, $R^3$ and $R^4$ may be connected to each other to form a cyclic structure together with the nitrogen atom; $R^5$ represents a $C_{1-20}$ alkyl group, a substituted $C_{1-20}$ alkyl group, a $C_{1-20}$ alkoxy group, a $C_{1-20}$ acylamino group, or a halogen atom; $X^{\ominus}$ represents an anion; x represents 0 to 80 mol%; y represents 0 to 90 mol%; z represents 10 to 100 mol%; and n represents an integer of 0, 1, or 2.

DETAILED DESCRIPTION OF THE INVENTION

The compound of the general formula (I) is further described below.

Examples of the copolymerizable monomers which may be copolymerized to form the monomer A, having at least two ethylenically unsaturated groups, include divinylbenzene, ethylene glycol dimethacrylate, isopropylene glycol dimethacrylate, neopentyl glycol dimethacrylate, tetramethylene glycol diacrylate, and tetramethylene glycol dimethacrylate. Particularly preferred among these compounds are divinylbenzene and ethylene glycol dimethacrylate.

B represents a monomer unit produced by copolymerization of copolymerizable ethylenically unsaturated monomers. Examples of such an ethylenically unsaturated monomer include ethylene; propylene; 1-butene; isobutene; styrene; α-methylstyrene; vinyltoluene; monoethylenically unsaturated esters of fatty acids such as vinyl acetate and allyl acetate; esters of ethylenically unsaturated monocarboxylic or dicarboxylic acids such as methyl methacrylate, ethyl acrylate, n-butyl acrylate, n-butyl methacrylate, n-hexyl methacrylate, n-octyl acrylate, benzyl acrylate, cyclohexyl methacrylate, and 2-ethylhexyl acrylate; monoethylenically unsaturated compounds such as acrylonitrile and methacrylonitrile; and dienes such as butadiene and isopropene.

Particularly preferred among these compounds are styrene, methyl methacrylate, and acrylonitrile.

B may contain two or more of the above-mentioned monomer units.

$R^1$ represents a hydrogen atom or a $C_{1-6}$ alkyl group such as a methyl group, an ethyl group, an n-propyl group, an n-butyl group, an n-amyl group, and an n-hexyl group. Particularly preferred among these groups are a hydrogen atom and a methyl group.

L represents a linkage group such as $-CH_2O-$, $-CH_2N(R^6)-$,

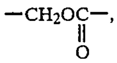

and

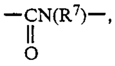

in which $R^6$ and $R^7$ each represents a hydrogen atom or an alkyl group. Preferred among these linkage groups are $-CH_2O-$, $-CH_2N(R^6)-$ (such as $-CH_2NH-$ and

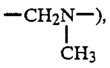

and

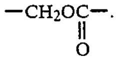

M represents a divalent group having 1 to 12 carbon atoms. Preferred examples of such a divalent group include alkylene groups such as methylene, ethylene, trimethylene and

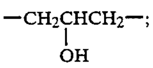

arylene groups such as

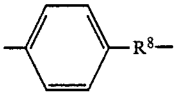

in which $R^8$ represents an alkylene group having 1 to 6 carbon atoms,

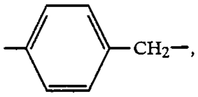

and

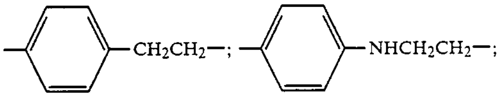

$-CH_2CH_2OCH_2CH_2-$; and $-CH_2CH_2NHCH_2CH_2-$.

$R^2$, $R^3$ and $R^4$, which are the same or different, each represents an alkyl group having 1 to 20 carbon atoms or anaralkyl group having 7 to 20 carbon atoms. Such an alkyl or aralkyl group include substituted alkyl or aralkyl groups.

At least two of $R^2$, $R^3$ and $R^4$ may be connected to each other to form a cyclic structure together with the nitrogen atom.

Examples of the alkyl group include unsubstituted alkyl groups such as a methyl group, an ethyl group, an n-propyl group, an isopropyl group, an n-butyl group, an isobutyl group, a t-butyl group, an n-amyl group, an isoamyl group, an n-hexyl group, a cyclohexyl group, an n-heptyl group, an n-octyl group, an 2-ethylhexyl group, an n-nonyl group, an n-decyl group, and an n-dodecyl group. The number of carbon atoms contained is such an alkyl group is preferably 1 to 10.

Examples of such a substituted alkyl group inculde alkoxyalkyl groups such as a methoxymethyl group, a methoxyethyl group, a methoxybutyl group, an ethoxyethyl group, an ethoxypropyl group, an ethoxybutyl group, a butoxyethyl group, a butoxypropyl group, a butoxybutyl group, and a vinyloxyethyl group; cyanoalkyl groups such as a 2-cyanoethyl group, a 3-cyanopropyl group, and a 4-cyanobutyl group; halogenated alkyl groups such as a 2-fluoroethyl group, a 2-choloroethyl group, and a 3-fluoropropyl group; an alkoxycarbonylalkyl groups such as an ethoxycarbonyl alkyl group; an allyl group; a 2-butenyl group; and a propargyl group.

Examples of such an aralkyl group include unsubstituted aralkyl groups such as a benzyl group, a phenethyl group, a diphenylmethyl group and a naphtylmethyl group; and substituted aralkyl groups such as an alkylaralkyl group (e.g. a 4-methylbenzyl group, a 2,5-dimethylbenzyl group, and a 4-isopropylbenzyl group), an alkoxyaralkyl group (e.g. a 4-methoxybenzyl group, a 4-ethoxybenzyl group, and a 4-(4-methoxyphenyl)benzyl group), a cyanoaralkyl group (e.g. a 4-cyanobenzyl group and a 4-(4-cyanophenyl)benzyl group), a perfluoroalkoxyalkyl group (e.g. a 4-pentafluoropropoxybenzyl group and a 4-undecafluorohexyloxybenzyl group), and a halogenated aralkyl group (e.g. a 4-chlorobenzyl group, a 4bromobenzyl group, a 3-chlorobenzyl group, a 4-(4-chlorophenyl)benzyl group, and a 4-(4-bromophenyl)benzyl group). The number of carbon atoms contained in such an aralkyl group is preferably 7 to 14.

Examples of the cyclic structure formed by the connection of at least two of $R^2$, $R^3$ and $R^4$ together with the nitrogen atom include cyclic structures formed by $R^2$ and $R^3$ such as

wherein m represents an integer of 4 to 12, and $R^4$ is as defined above, and

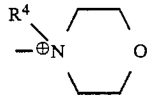

wherein $R^4$ is as defined above; and cyclic structures formed by $R^2$, $R^3$ and $R^4$ such as

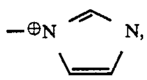, 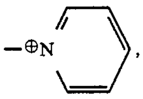, 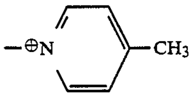

and

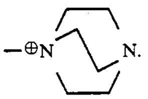

$R^5$ represents a $C_{1-20}$ alkyl group, a substituted $C_{1-20}$ alkyl group, a $C_{1-20}$ alkoxy group, a $C_{1-20}$ acylamino group, or a halogen atom. Specific examples of such an alkyl group or substituted alkyl group are the same as those described above with respect to $R^2$, $R^3$ and $R^4$.

Examples of the alkoxy group represented by $R^5$ include a methoxy group, an ethoxy group, a butoxy group, hexyloxy group, an octyloxy group, and a benzyloxy group. Examples of the acylamino group represented by $R^5$ include an acetamido group, a propionamido group, and a benzamido group.

$X^\ominus$ represents an anion such as a halogen ion (e.g., a chlorine ion, a bromine ion, and an iodine ion), an alkylsulfuric acid ion (e.g., a methylsulfuric acid ion and an ethylsulfuric acid ion), an alkyl- or arylsulfonic acid ion (e.g., a methanesulfonic acid ion, an ethanesulfonic acid ion, a benzenesulfonic acid ion, and a P-toluenesulfonic acid ion), an acetic acid ion, and a sulfuric acid ion. Particularly preferred among these anions is the chlorine ion.

x is 0 to 80 mol%, preferably 1.0 to 60 mol%. y is 0 to 90 mol%, preferably 0 to 50 mol%. z is 10 to 100 mol%, preferably 20 to 99 mol%.

n represents an integer of 0, 1 or 2.

Specific examples of polymer mordants of the present invention are described hereinafter, but the present invention is not limited thereto.

The proportion of x, y and z is represented in terms of molar ratio.

Example (1)

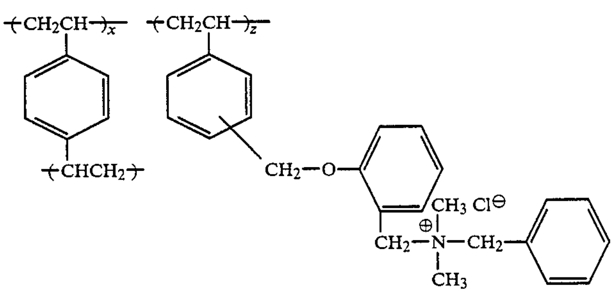

x:z = 5:95

Example (2)

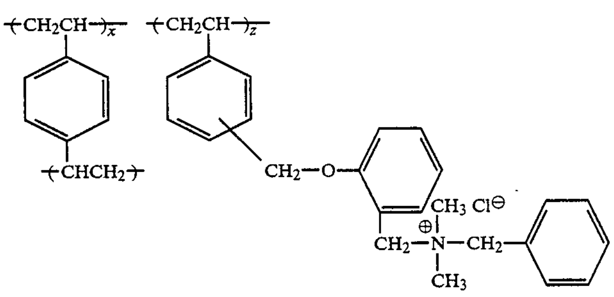

x:z = 30:70

Example (3)

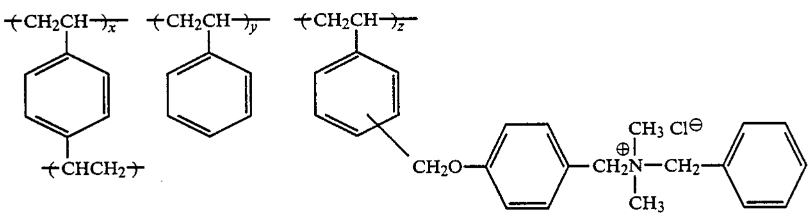

x:y:z = 20:40:40

-continued
Example (4)
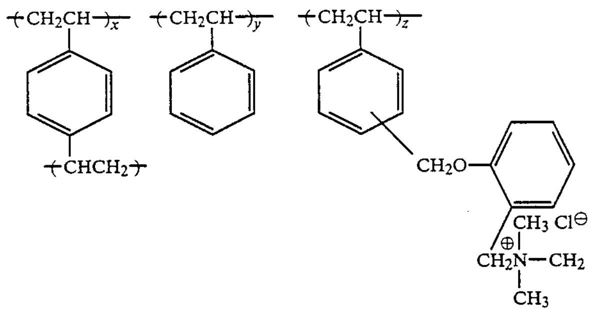
x:y:z = 30:40:30
Example (5)
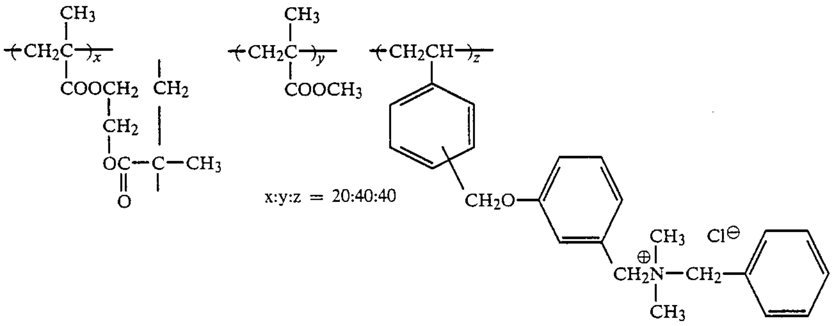
x:y:z = 20:40:40
Example (6)
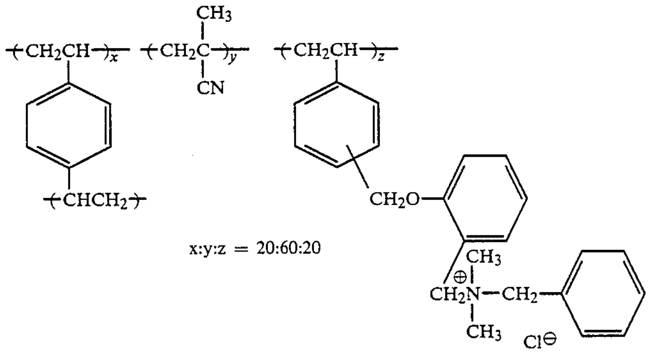
x:y:z = 20:60:20
Example (7)
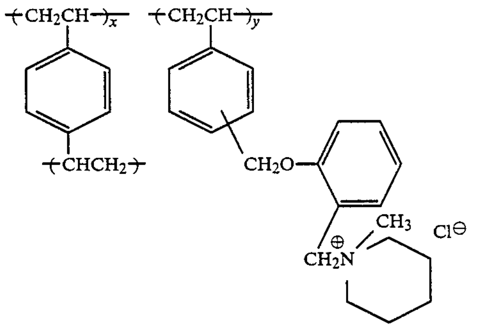
x:y = 5:95
Example (8)
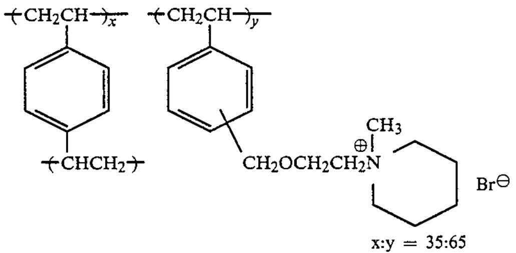
x:y = 35:65

-continued
Example (9)
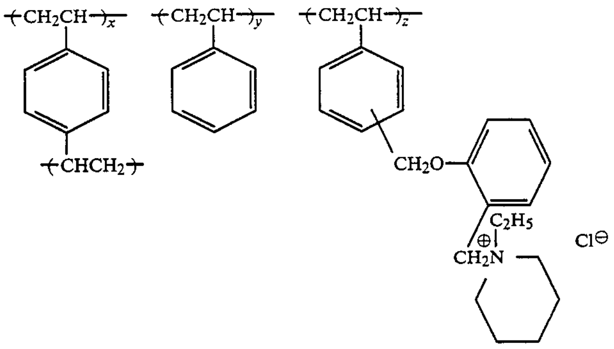
x:y:z = 30:40:30
Example (10)
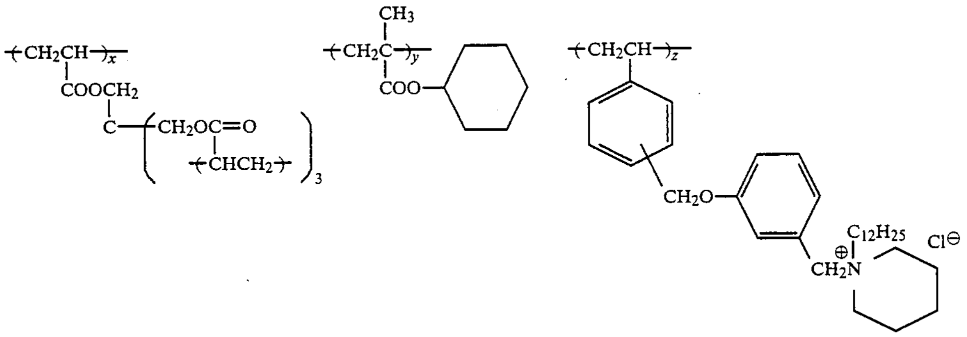
x:y:z = 5:25:70
Example (11)
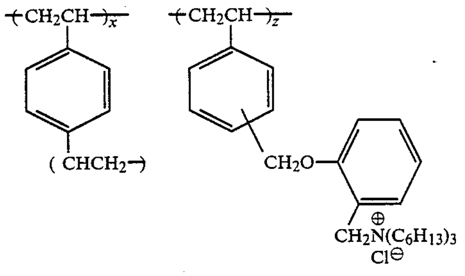
x:z = 40:60
Example (12)
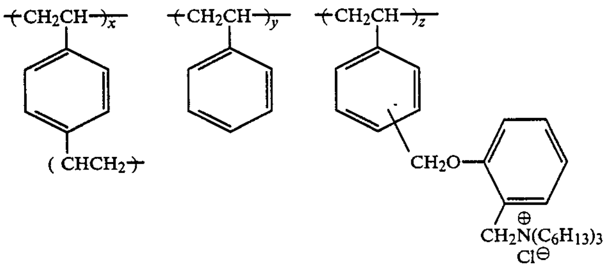
x:y:z = 30:30:40
Example (13)
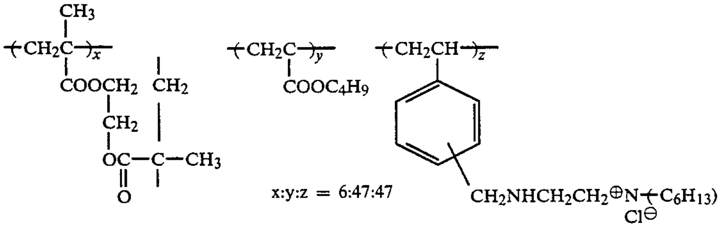
x:y:z = 6:47:47

-continued
Example (14)
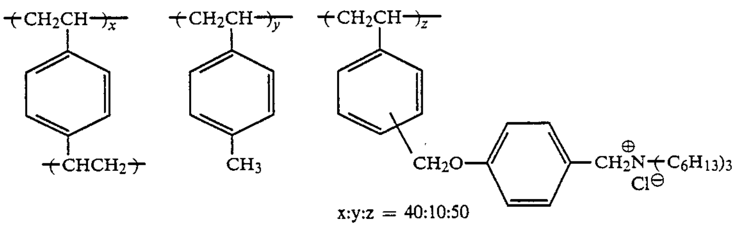
x:y:z = 40:10:50
Example (15)
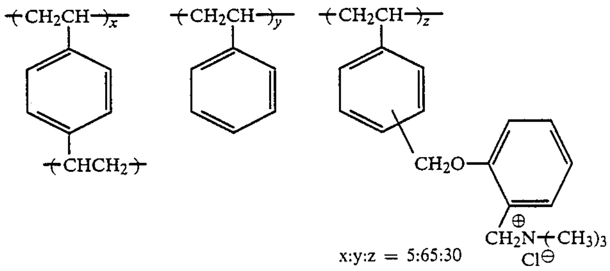
x:y:z = 5:65:30
Example (16)
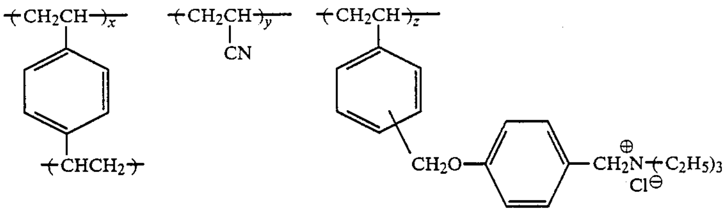
x:y:z = 30:50:20
Example (17)
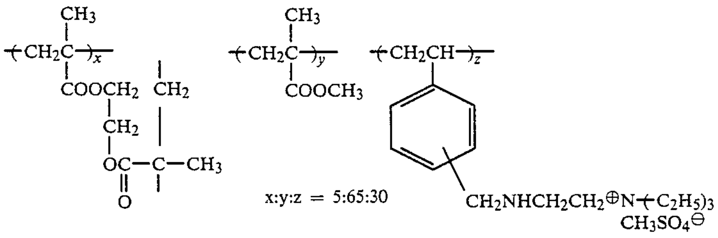
x:y:z = 5:65:30
Example (18)
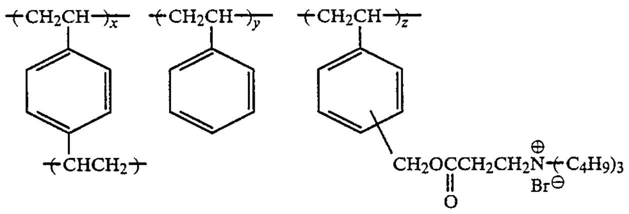
x:y:z = 5:45:50
Example (19)
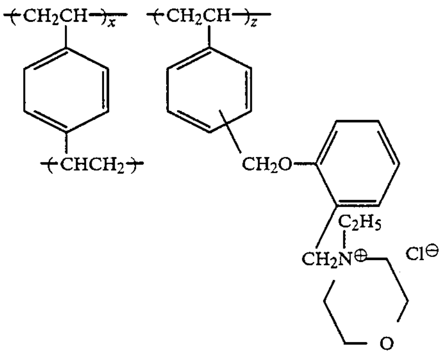
x:z = 35:65

-continued

Example (20)

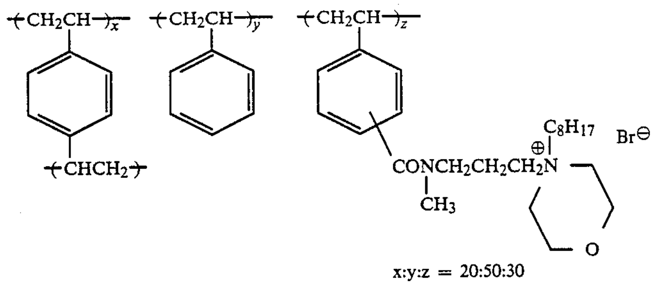

x:y:z = 20:50:30

The polymer mordant of the present invention represented by the general formula (I) can generally be obtained by emulsion polymerizing a copolymerizable monomer having at least two ethylenically unsaturated groups, an ethylenically unsaturated monomer, and an unsaturated monomer of the general formula (II):

(II)

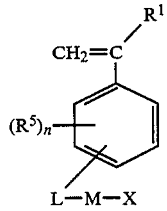

wherein X represents a monovalent group which can be an anion represented by $X^-$, and $R^1$, L, M, $R^5$, and n are as defined above, such as o-chloromethylphenoxy methylstyrene, p-chloromethylanilino methylstyrene, and 2-chloroethoxy methylstyrene and, then, quaternarizing the emulsion polymer thus obtained with a tertiary amine having the structural formula

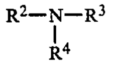

such as trimethylamine, triethylamine, tri-n-butylamine, tri-n-hexylamine, pyridine, and 4-methylpyridine.

As described later in Synthesis Examples 1 and 2, the unsaturated monomer of the general formula (II) can be prepared by, for example, reacting a halogenated methylstyrene (e.g., chloromethylstyrene and bromomethylstyrene) with a diol (e.g., hydroxybenzyl alcohol and ethylene glycol) and then subjecting the residual hydroxyl groups to halogenation (e.g., chlorination and bromination) or esterification (into, for example, alkylsulfuric acid esters or alkyl- or arylsulfonic acid esters).

The polymer mordant of the present invention represented by the general formula (I) can also be obtained by emulsion polymerizing a copolymerizable monomer having at least two ethylenically unsaturated groups, an ethylenically unsaturated monomer, and an unsaturated monomer of the general formula (III):

(III)

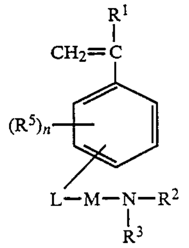

wherein $R^1$, $R^2$, $R^3$, L, M, $R^5$, and n are as defined above, such as 2-dimethylamino ethoxy methylstyrene, 2-dimethylamino ethylamino methylstyrene, and dimethylamino methylphenoxy methylstyrene and, then, quaternarizing the emulsion polymer thus obtained with an alkylating agent or aralkylating agent having the structural formula $R^4$—X wherein $R^4$ and X are as defined above (e.g., using alkylating agents such as methyl p-toluenesulfonate, sulfate, diethyl sulfate, ethyl bromide, n-propyl bromide, allyl chloride, n-butyl bromide, chloro-2-butene, ethyl chloroacetate, n-hexyl bromide, and n-octyl bromide and aralkylating agents such as benzyl chloride, benzyl bromide, p-nitrobenzyl chloride, p-chlorobenzyl chloride, p-methylbenzyl chloride, p-isopropylbenzyl chloride, dimethylbenzyl chloride, p-methoxybenzyl chloride, p-pentafluoropropenyloxybenzyl chloride, naphthyl chloride, and diphenylmethyl chloride; preferably, methyl p-toluenesulfonate, dimethyl sulfate, diethylsulfate, and benzyl chloride).

The unsaturated monomer of the general formula (III) can be prepared by reacting the unsaturated monomer of the general formula (II) with a secondary amine of the general formula (V):

(V)

wherein $R_2$ and $R_3$ are as defined above. Further, it can be prepared by reacting a halogenated methylstyrene (e.g., chloromethylstyrene and bromomethylstyrene) with a diamine (e.g., N,N-diethylethylenediamine and N,N-dihexylethylenediamine).

The above emulsion polymerization is effected in the presence of at least one suface active agent selected from the group consisting of anionic surface active agents such as Triton ® 770 from Rohm & Haas; cationic surface active agents such as cetyl trimethylammonium chloride and stearyl trimethylammonium chloride; and nonionic surface active agents such as polyvinyl alchol; and a radical initiator such as a combination of potassium persulfate and potassium hydrogensulfite.

The above quaternarization reaction is generally effected at a temperature of 0° to about 100° C., preferably 40° to 70° C.

The compound of the present invention of the general formula (I) can also be prepared by a process described in Japanese Patent Application (OPI) No. 120609/80 if the compound of the general formula (IV) shown below is water-insoluble (the term "water-insoluble" in the case of the compound of the general formula (IV) means that no more than 5 g of the compound of the general formula (IV) is soluble in 100 g of water).

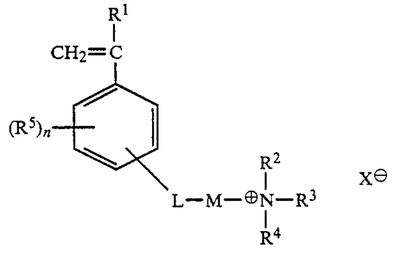

(IV)

wherein $R^1$, $R^2$, $R^3$, $R^4$, $R^5$, L, M, $X^{\ominus}$, and n are as defined above.

This process enables the emulsion-polymerization of a copolymerizable monomer having at least two ethylenically unsaturated groups, an ethylenically unsaturated monomer, and a compound of the general formula (IV) into a compound of the general formula (I).

If the monomer of the general formula (IV) is water-soluble, the synthesis can be effected by a process which comprises simultaneously adding a monomer solution (if monomers are incompatible with each other, an auxiliary solvent such as water, an alcohol and acetone may be used) and a polymerization initiator to heated water.

The polymerization may be effected at a temperature of 50° to 100° C. However, if the polymerization is effected at a temperature of 80° to 100° C., a better dispersion can be obtained. The emulsion polymerization is generally effected in the presence of at least one surface active agent selected from the group consisting of nonionic surface active agents such as polyvinyl alcohol and polyoxyethylene nonyl phenyl ether, and cationic surface active agents such as cetyl trimethylammonium chloride, and a radical initiator such as a combination of potassium persulfate and sodium sulfite.

The present invention will be further illustrated in the following synthesis examples, but the present invention should not be construed as being limited thereto. All percentages, ratios, etc., referred to herein are by weight, unless otherwise specified.

SYNTHESIS EXAMPLE 1

Preparation of o-hydroxymethylphenoxy methylstyrene 154.3 g (0.8 mol) of 28% sodium methoxide solution in methanol was added to a solution which had been obtained by adding 200 ml of methanol to 99.3 g (0.8 mol) of o-hydroxybenzyl alcohol. The resulting mixture was stirred at a temperature of 40° C. for about 1 hour. 122 g (0.8 mol) of chloromethylstyrene from which polymerization inhibitor had been removed by alkali washing was added dropwise to the mixture. The mixture was stirred under reflux for about 4 hours. The material thus refluxed was allowed to cool to room temperature. The resulting NaCl was filtered out. After the methanol was removed from the filtrate by distillation, the residue was repeatedly and thoroughly washed with hexane until chloromethylstyrene, as raw material, and by-products were completely removed therefrom. 400 ml of chloroform was added thereto for dissolution. The resulting solution was washed with distilled water two or three times. The resulting chloroform phase was separated out. The chloroform phase thus separated was dried by sodium sulfate. The chloroform was then removed by distillation to obtain 123 g of a pale yellow liquid (yield: 64%). This liquid was the desired material. It was confirmed by thin layer chromatography (TLC) using silica gel and gas chromatography (GLC) that this product had a high purity (98% or more).

| | Elemental analysis (%) | |
|---|---|---|
| | C | H |
| Calculated | 80.00 | 6.67 |
| Found | 79.93 | 6.70 |

SYNTHESIS EXAMPLE 2

Preparation of o-chloromethylphenoxy methylstyrene 47.4 g (0.6 mol) of pyridine was added to a solution which had been obtained by adding 500 ml of chloroform to 120 g (0.5 mol) of o-hydroxymethylphenoxy methylstyrene. 71.4 g (0.6 mol) of thionyl chloride was dropwise added to the mixture with stirring while keeping the temperature at 3° to 4° C. in an ice bath. The mixture was stirred at the same temperature for 1 hour and then at a temperature of 30° C. for 1 hour. After being washed with water, the mixture was dried by sodium sulfate. The chloroform was removed from by distillation under reduced pressure to obtain a yellow liquid as the desired product.

As in Synthesis Example 1, the product thus obtained was confirmed by TLC and GLC to have a high purity (98% or more).

| | Elemental analysis (%) | | |
|---|---|---|---|
| | C | H | Cl |
| Calculated | 74.3 | 5.8 | 13.7 |
| Found | 74.1 | 6.0 | 14.1 |

SYNTHESIS EXAMPLE 3

Preparation of Example Compound (1)

(i) Preparation of intermediate latex (divinylbenzene-co-o-chloromethylphenoxy methylstyrene)

700 ml of distilled water was put into a reaction vessel. The distilled water was then deaerated by nitrogen gas. 10 ml of Triton® 770, 98.3 g (0.38 mol) of o-chloromethylphenoxy methylstyrene, and 2.6 g (0.02 mol) of divinylbenzene were added to the distilled water thus deaerated. The mixture was then heated to a temperature of 60° C. A mixture of 20 ml of deaerated distilled water and 1.00 g of potassium persulfate and a mixture of 10 ml of deaerated distilled water and 0.38 g of sodium hydrogensulfite were simultaneously added to the mixture thus heated. The resulting mixture was further heated with stirring for 5 hours. Thereafter, the mixture was allowed to cool to room temperature and, then, filtered to obtain a polymer dispersion (latex).

(ii) Quaternarization reaction 150 g of the above latex having a solid content concentration of 12.0% was put into a reaction vessel. 40 g of isopropyl alcohol was added to the latex with stirring. 8.7 g of dimethylbenzylamine was dropwise added to the mixture at room temperature over a period of 30 minutes. The mixture was gradually heated to a temperature of 70° C. with stirring for 2 hours. After being allowed to cool to room temperature, the mixture was filtered to obtain a polymer dispersion mordant (Example Compound 1).

SYNTHESIS EXAMPLES 4 and 5

Example Compounds (2) and (4) were prepared in the same manner as described in Synthesis Example 3.

SYNTHESIS EXAMPLES 6 and 7

Example Compounds (7) and (9) were prepared in the same manner as described in synthesis Example 3, except that distilled water was used instead of the isopropyl alcohol in the quaternarization reaction.

SYNTHESIS EXAMPLE 8

Preparation of Example Compound (11)

(i) Preparation of quaternary amine monomer (N-o-vinylbenzyloxybenzyl, N,N,N-trihexylammonium chloride)

68.4 g (0.26 mol) of o-chloromethylphenoxy methylstyrene, 60.5 g (0.22 mol) of tri-n-hexylamine, and 0.5 g of nitrobenzene as a polymerization inhibitor were put into a 1-liter three-necked flask. The materials were heated with stirring under reflux for 7 hours.

After the solution was allowed to cool to room temperature, the solution was washed with 500 ml of n-hexane several times to remove the unreacted o-chloromethylphenoxy methylstyrene therefrom. The solution was then concentrated so that crystals were deposited. The crystals were recrystallized from 300 ml of ethyl acetate to obtain 75.3 g of a quaternary ammonium monomer as the desired product in the form of white crystal. (yield: 63.7%)

(ii) Preparation of polymer dispersion (Example Compound (11))

0.8 g of 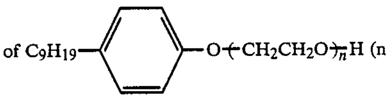 (n = 40)

(commercially available from NIHON EMULSION K.K.) as a surface active agent, 15.8 g (0.03 mol) of the above quaternary amine monomer, 2.6 g (0.02 mol) of divinylbenzene, and 130 ml of distilled water were put into a 300-ml three-necked flask. The mixture was then heated to a temperature of 60° C. with stirring. A polymerization initiator which had been obtained by dissolved 0.15 g of 2,2'-azobis(2-amidinopropane)hydrochloride in 10 ml of deaerated distilled water was added to the mixture. The mixture was further heated to a temperature of 60° C. for 5 hours with stirring. After the solution was allowed to cool to room temperature, the solution was filtered to obtain a polymer dispersion mordant (11).

SYNTHESIS EXAMPLE 9

Example Compound (12) was prepared in the same manner as described in Synthesis Example 8.

The polymer mordant of the present invention can be used for the color diffusion transfer process, heat-developable light sensitive materials and for dyeing of an anti-halation layer of the type described in U.S. Pat. No. 3,282,699.

In the layer comprising the polymer of the present invention, a film may be formed by the polymer alone. The layer of the present invention also may comprise natural or synthetic hydrophilic polymers commonly used in the field of photography such as gelatin, polyvinyl alcohol and polyvinyl pyrrolidone (preferably polyvinyl alcohol, etc.). Two or more kinds of polymer mordants of the present invention (e.g., a combination of a polymer mordant and a polymer dispersion mordant) may be used in one or more layers. Alternatively, the polymer mordant of the present invention may be used in a mixture with another mordant in the same layer, or used with another mordant contained in a separate layer of the same photographic element. Furthermore, the polymer mordant of the present invention may be used in an extra dye capturing mordant layer such as described in U.S. Pat. No. 3,930,864. Mordants which may be used in combination with the polymer mordant of the present invention include those described in U.S. Pat. Nos. 4,131,469 and 4,147,548, and Japanese Patent Application (OPI) Nos. 136626/77, 126027/79 and 145529/79.

The amount of the polymer mordant to be used can be easily determined by those skilled in the art depending on the amount of dye to be mordanted, the kind and composition of the polymer mordant, and the image formation process to be used. Roughly speaking, the amount of the polymer mordant to be used is about 20 to 80% by weight or about 0.5 to 15 $g/m^2$, preferably 40 to 60% by weight or 1 to 10 $g/m^2$ based on the weight of the mordant layer.

Other materials for which the polymer mordant of the present invention is used in the color diffusion transfer process will be described hereinafter.

If a photographic element containing a polymer mordant of the present invention is a photographic film unit which is adapted to pass through a gap between a pair of juxtaposed press members so that it is processed, it consists of the following elements:

(1) light-sensitive element, (2) image-receiving element containing a mordant of the present invention, (3) for example, rupturable container comprising a means for releasing an alkaline processing composition and optionally containing a silver halide developer, and, (4) at least one support One embodiment of the film unit is such that after a light-sensitive element comprising a single or plurality of silver halide emulsion layers coated on a support is exposed to light, it is laminated with an image-receiving element having at least one layer comprising a polymer mordant of the present invention coated on a support in a face-to-face relationship therewith so that an alkaline processing composition is spread between the two elements to process the light-sensitive element. The film unit is preferably shielded from light at both sides when withdrawn from the camera. The image-receiving element may be peeled off after transfer or it may be arranged so that the image can be viewed without peeling the image-receiving element as described in U.S. Pat. No. 3,415,645.

Another embodiment of the film unit is such that the support, image-receiving element and light-sensitive element are integrately disposed. Belgian Pat. No. 757,960 discloses an effective embodiment in which an image-receiving layer (containing a polymer mordant of the present invention), a substantially opaque light reflecting layer (e.g., $TiO_2$ layer or carbon black layer), and a single or plurality of light-sensitive layers are provided on a transparent support. After the light-sensitive layer is exposed to light, it is laminated with an opaque cover sheet in a face-to-face relationship therewith so that a processing composition is spread therebetween.

Another integrated lamination type embodiment of the film unit to which the present invention can be applied is disclosed in Belgian Pat. No. 757,959. This embodiment is such that a laminate comprising a transparent support having an image-receiving layer (containing a polymer mordant of the present invention), a substantially opaque light reflecting layer (as described above) and a single or plurality of light-sensitive layers provided thereon is laminated with a transparent cover sheet in a face-to-face relationship therewith. Rupturable containers which are adapted to absorb an alkaline processing composition containing an opacifying agent (e.g., carbon black) are disposed adjacent the top layer of the light-sensitive layer and the transparent cover sheet. In operation, the film unit is exposed to light through the transparent cover sheet. When such a film unit which is light-exposed is withdrawn from the camera, the cotainers are ruptured by pressing members so that the processing composition (containing an opacifying agent) is spread between the light-sensitive layer and the cover sheet. In this manner, the film unit is shielded from light so that development proceeds. This photogrpahic element comprise be an image-receiving element which is not integrated with a light-sensitive layer.

The dye image providing compound which may be used in combination with the silver halide emulsion layer in the present invention is of the negative or positive type. When processed with an alkaline processing composition, such a dye image providing compound initially is mobile or immobile in the photographic element.

As such a negative type dye image providing compound useful in the present invention there may be used a coupler which produces or releases a dye upon reaction with an oxidized color developing agent. Specific examples of such a coupler include those described in U.S. Pat. No. 3,227,550 and Canadian Pat. No. 602,607. As negative type dye image providing compounds suitable in the present invention there may be used a dye releasing redox compound which releases a dye upon reaction with an oxidized developed agent or electron transfer agent. Typical examples include those described in U.S. Pat. Nos. 3,928,312, 4,135,929, 4,054,428, 4,336,322, and 4,053,312.

As immobile positive type dye image providing compounds there may be used a compound which releases a diffusive dye without receiving any electrons (i.e., without being reduced) or after receiving at least one electron (i.e., after being reduced) during photographic processing under an alkaline condition. Specific examples of such a compound are described in U.S. Pat. Nos. 4,199,354, 3,980,479, 4,199,355, 4,139,379, 4,139,389, and 4,232,107, and Japanese Patent Application (OPI) No. 69033/78.

Positive type dye image providing compounds which are initially mobile under an alkaline photographic processing condition are also useful as photogrpahic elements in the present invention. Specific examples of such compounds are described in U.S. Pat. Nos. 3,482,972 and 3,880,658.

The dye produced from the dye image providing compound used in the present invention may be an existing dye or a dye precursor which can be converted to a dye during the photographic processing or additional processing step. The final image dye may or may not be metal-complexed. As typical dyes useful in the present invention there may be used azo dyes, azomethine dyes, anthraquinone dyes and phthalocyanine dyes which are or are not metal-complexed. Particularly important among these dyes are cyan, magenta and yellow dyes.

Examples of such yellow dye image providing compounds are described in U.S. Pat. Nos. 3,597,200, 3,309,199, 4,013,633, 4,245,028, 4,156,609, 4,139,383, 4,195,992, 4,148,641 and 4,148,643, Japanese patent application (OPI) Nos. 114930/76, 16130/81 and 71072/81, and *Research Disclosure* Nos. 17630 (1978) and 16475 (1977).

Examples of such magenta dye image providing compounds are described in U.S. Pat. Nos. 3,453,107, 3,544,545, 3,932,380, 3,931,144, 3,932,308, 3,954,476, 4,233,237, 4,255,509, 4,250,246, 4,142,891, 4,207,104 and 4,287,292 and Japanese patent application (OPI) Nos. 106727/77, 23628/78, 36804/80, 73057/81, 71060/81 and 134/80.

Examples of such cyan dye image providing compounds are described in U.S. Pat. Nos. 3,482,972, 3,929,760, 4,013,635, 4,268,625, 4,171,220, 4,242,435, 4,142,891, 4,195,994, 4,147,544 and 4,148,642, British Patent No. 1,551,138, Japanese patent application (OPI) Nos. 99431/79, 8827/77, 47823/78, 143323/78, 99431/79 and 71061/81, European Patent (EPC) Nos. 53,037 and 53,040, and *Research Disclosure* Nos. 17,630 (1978), 16,475 (1975) and 16,475 (1977).

As a dye precursor there may be used a dye releasing redox compound having a dye portion whose light absorption is shifted in the light-sensitive element. Specific examples of such a redox compound are described in U.S. Pat. Nos. 4,310,612, T-999,003, 3,336,287, 3,579,334 and 3,982,946, British Patent No. 1,467,317, and Japanese patent application (OPI) No. 158638/82.

A process of obtaining a color diffusion transfer image using a dye releasing redox compound is described in *Photographic Science and Engineering*, vol. 20, No. 4, pp. 155–164 (July/August 1976).

In the above process, any silver halide developing agent that can cross-oxidize a dye releasing redox compound can be used. Such a silver halide developing agent may be contained in an alkaline processing composition or any appropriate layer of the photographic element.

Examples of developing agents which may be used in the present invention include hydroquinones, aminophenols, phenylenediamines and pyrazolidinones such as phenidone, 1-phenyl-3-pyrazolidinone, dimezone (i.e., 1-phenyl-4,4-dimethyl-3-pyrazolidinone), 1-p-tolyl-4-methyl-4-oxymethyl-3-pyrazolidinone, 1-(4'-methoxyphenyl)-4-methyl-4-oxymethyl-3-pyrazolidinone and 1-phenyl-4-methyl-4-oxymethyl-3-pyrazolidinone as described in Japanese patent application (OPI) No. 16131/81.

Particularly preferred among these developing agent are black-and-white developers capable of reducing stain formation in the image-receiving layer (especially pyrazolidinones) rather than color developers such as phenylenediamines.

The processing composition used to process the photographic element of the present invention preferably contains a base such as sodium hydroxide, potassium hydroxide, sodium carbonate or sodium phosphate, thus exhibiting a pH of about 9 or more, and has an alkalinity of 11.5 or more. The processing composition of the present invention may contain an anti-oxidant such as sodium sulfite, ascorbates or piperidinohexose reductone or may contain a silver ion concentration adjustor such as potassium bromide. Alternatively, the present processing composition may contain a thickening compound such as hydroxyethyl cellulose and sodium carboxymethyl cellulose.

Furthermore, the present alkaline processing composition may contain a compound having a function of promoting development or dye diffusion, such as benzyl alcohol.

The photographic element of the present invention has a support free from remarkable change in dimension due to processing. Examples of such a support include cellulose acetate film, polystyrene film, polyethylene terephthalate film and polycarbonate film. Other useful supports include paper and paper laminated with a water-impermeable polymer such as polyethylene.

One of the features of the present invention is that a dye mordanted by the mordant of the general formula (I) has relatively small chemical change or dispersion due to light. Furthermore, the most important feature of the mordant of the present invention is that the mordant of the present invention can firmly hold a dye. This enables early appearance of image in diffusion transfer photographic system and provides an excellent sharpness in dye images. Furthermore, the sharpness in dye images shows little or no change even after prolonged prevention.

The present invention will be further illustrated in the following examples, but the present invention should not be construed as being limited thereto.

EXAMPLE

Light-sensitive sheet Nos. 1-10, a cover sheet and a processing solution used for color diffusion transfer photographic material were prepared in the following manner:

Preparation of light-sensitive sheet Nos. 1-10

The following layers were applied to a subbed transparent polyethylene terephthalate support in order.

(1) An image-receiving layer containing $6.6\times10^{-3}$ equivalent/$m^2$ (as calculated in terms of quaternary salt portion) of a polymer mordant and 3.0 $g/m^2$ of gelatin. As mordants of the present invention, the above mentioned Example Compounds (1), (2), (4), (7), (9), (11) and (12) were used. As comparative mordants, the following compounds (I), (II) and (III) were used.

Comparative Mordant (I)

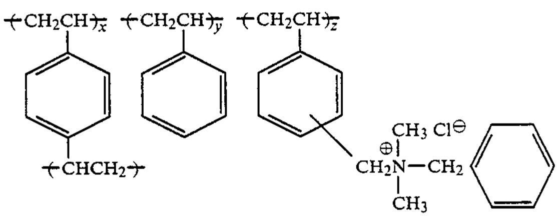

x:y:z = 5:45:50

Comparative Mordant (II)

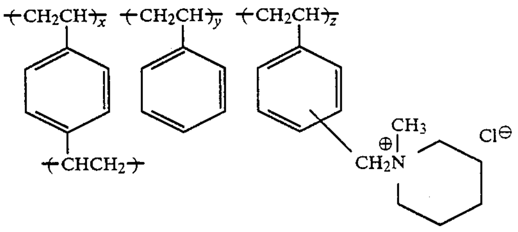

x:y:z = 5:47.5:47.5

Comparative Mordant (III)

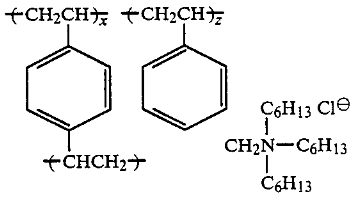

x:z = 5:95

(2) A white color reflecting layer containing 20 $g/m^2$ of titanium dioxide and 2.0 $g/m^2$ of gelatin.

(3) A light-shielding layer containing 2.0 $g/m^2$ of carbon black and 1.5 $g/m^2$ of gelatin.

(4) A layer containing 0.44 $g/m^2$ of a cyan dye releasing redox compound of the general formula shown below, 0.09 $g/m^2$ of tricyclohexyl phosphate, 0.008 $g/m^2$ of 2,5-di-t-pentadecyl hydroquinone and 0.8 $g/m^2$ gelatin.

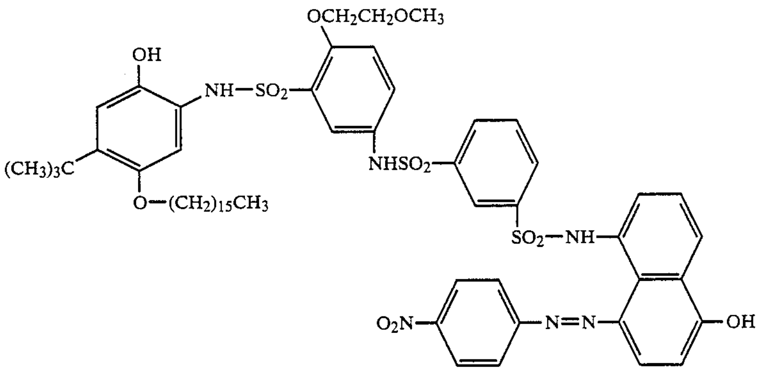

(5) A red-sensitive emulsion layer containing 1.03 $g/m^2$ (as calculated in terms of the amount of silver) of a red-sensitive internal latent image direct positive silver bromide emulsion, 1.2 $g/m^2$ of gelatin, 0.04 $mg/m^2$ of a nucleating agent of the general formula shown below and 0.13 $g/m^2$ of 2-sulfo-5-n-pentadecyl hydroquinone sodium salt.

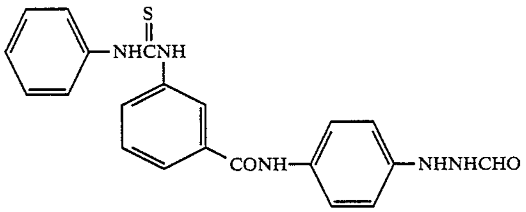

(6) A color mixture preventive layer containing 0.8 $g/m^2$ of gelatin, 1.0 $g/m^2$ of 2,5-di-t-pentadecyl hydroquinone and 1.0 $g/m^2$ of polymethyl methacrylate.

(7) A layer containing 0.40 $g/m^2$ of a magenta dye releasing redox compound of the general formula shown below, 0.08 $g/m^2$ of tricyclohexyl phosphate and 0.9 $g/m^2$ of gelatin.

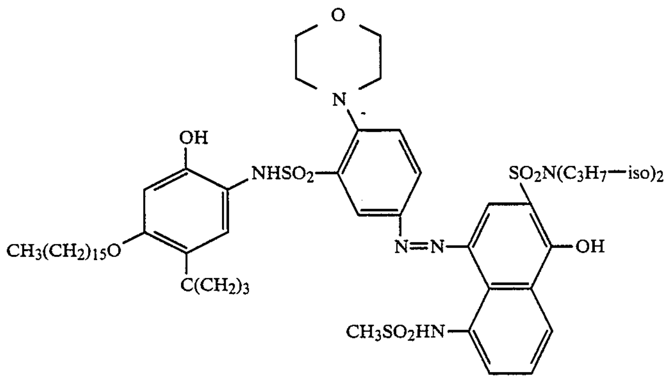

(8) A layer containing 0.82 $g/m^2$ (as calculated in terms of the amount of silver) of a green-sensitive internal latent image direct reversal silver bromide emulsion, 0.9 $g/m^2$ of gelatin, 0.03 $mg/m^2$ of the same nucleating agent as used in layer (5), and 10.08 $g/m^2$ of 2-sulfo-5-n-pentadecyl hydroquinone sodium salt.

(9) Same as layer (6)

(10) A layer containing 0.53 $g/m^2$ of a yellow dye releasing redox compound of the general formula shown below, 0.13 $g/m^2$ of tricyclohexyl phosphate, 0.014 $g/m^2$ of 2,5-di-t-pentadecyl hydroquinone and 0.7 $g/m^2$ of gelatin.

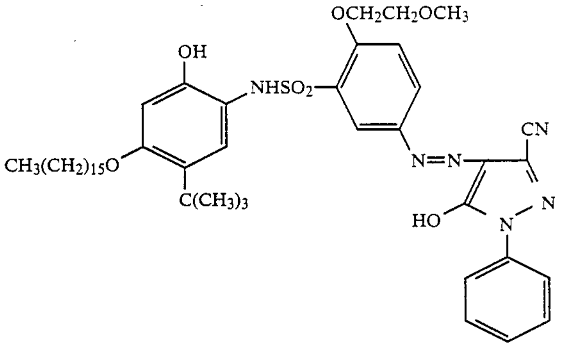

(11) A blue-sensitive emulsion layer containing 1.09 $g/m^2$ (as calculated in terms of the amount of silver) of a blue-sensitive internal latent image direct positive silver bromide emulsion, 1.1 $g/m^2$ of gelatin, 0.04 $mg/m^2$ of the same nucleating agent as used in layer (5) and 0.07 $g/m^2$ of 2-sulfo-5-n-pentadecyl hydroquinone sodium salt.

(12) A protective layer containing 0.5 $g/m^2$ of gelatin, 0.06 $g/m^2$ of polymethyl methacrylate latex, and 0.02 $g/m^2$ of triacryloyl triazine as a hardner.

Preparation of cover sheet

A cover sheet was prepared by applying the following layers to a transparent polyethylene terephthalate support in order.

(1') A layer containing 22 $g/m^2$ of a 80:20 (by weight) copolymer of acrylic acid and butyl acrylate and 0.44 $g/m^2$ of 1,4-bis(2,3-epoxypropoxy)-butane.

(2') A layer containing 3.8 $g/m^2$ of acetyl cellulose (100 g of which produces 39.4 g of acetyl group upon hydrolysis), 0.23 $g/m^2$ of a methanol-ring-opened product of a 60:40 (by weight) copolymer (molecular weight: about 50,000) of styrene and maleic anhydride, and 0.154 $g/m^2$ of 5-(2-cyano-1-methylethylthio)-1-phenyltetrazole.

(3') A 2 μm-thick layer prepared by application of a 6:4 (solids content ratio) mixture of a 49.7:42.3:3:5 (by weight) copolymer latex of styrene, n-butyl acrylate, acrylic acid and N-methylol acrylamide and a 93:4:3 (by weight) copolymer latex of methyl methacrylate, acrylic acid and N-methylol acrylamide.

| Composition of processing solution | |
|---|---|
| 1-p-Tolyl-4-hydroxymethyl-4-methyl-3-pyrazolidone | 6.9 g |
| Methyl hydroquinone | 0.3 g |
| 5-Methyl benzotriazole | 3.5 g |
| Sodium sulfite (anhydrous) | 0.2 g |
| Carboxymethyl cellulose sodium salt | 58 g |
| Potassium hydroxide (28% aqueous solution) | 200 cc |
| Benzyl alcohol | 1.5 cc |
| Carbon black | 150 g |
| Water | 685 cc |

The light-sensitive sheet Nos. 1 to 10 were exposed to light through a continuous wedge. The light-sensitive sheets thus light-exposed were then allowed to pass through a gap between a pair of press rollers so that the processing solution was spread between the light-sensitive sheet and the cover sheet to a thickness of 80 μm.

After being dried at a temperature of 40° C. and a RH (relative humidity) of 30%, these specimens were measured for density and then irradiated with light by means of a fluorescent fade-o-meter. The variation of cyan density was determined from the difference in density before and after irradiation. The results are shown in Table 1.

The light-sensitive sheets Nos. 1 to 10 were exposed to light through a wedge having a different frequency for sharpness test and, then, processed with the processing solution in the same manner as above. After 1 hour passed, these specimens were measured for density by means of a microdensitometer. The space frequency at which MTF of magenta is 0.5 was determined from the above measurement. The results are shown in Table 1. Thereafter, these specimens were preserved at a temperature of 50° C. and a RH of 80% for 3 days and, then, again measured for MTF.

"MTF" stands for Modulation Transfer Function. The details of MTF are described in T. James, *The Theory of Photographic Process* pp. 604–6–7 (4th edition, 1977; Mcmillan, New York).

MTF is the index of sharpness. Light-sensitive materials which can reproduce fine lines faithfully show higher MTF values. The sharpness of diffusion transfer photographic materials is mainly determined by the mordant power between dye and mordant. In particular, it has already been found that the higher the mordanting power is, the lower due to sharpness deterioration during ageing after processing is.

As apparent from Table 1, the photographic material comprising the present mordant shows a good compatibility between fastness to light and sharpness while those comprising the comparative mordants show incompatibility between the two properties.

TABLE 1

| Light-sensitive layer No. | Polymer mordant | Fastness to[1] light (reduction in density) | Sharpness (MTF 0.5 C/mm)[2] 1 hour after processing | After ageing[3] under heat |
|---|---|---|---|---|
| 1 | Present compound Ex. (1) | 0.24 | 3.2 | 2.9 |
| 2 | Present compound Ex. (2) | 0.26 | 3.3 | 3.0 |
| 3 | Present compound Ex. (4) | 0.25 | 3.3 | 3.2 |
| 4 | Comparative compound Ex. (I) | 0.26 | 3.2 | 1.5 |
| 5 | Present compound Ex. (7) | 0.47 | 3.3 | 3.0 |
| 6 | Present compound Ex. (9) | 0.48 | 3.2 | 3.1 |
| 7 | Comparative compound Ex. (II) | 0.49 | 3.1 | 2.2 |
| 8 | Present compound Ex. (11) | 0.59 | 3.4 | 3.2 |
| 9 | Present compound Ex. (12) | 0.59 | 3.4 | 3.3 |
| 10 | Comparative compound Ex. (III) | 0.69 | 3.3 | 2.9 |

[1]Reduction in density at point which the initial density was 1.0 after 28 days of ageing under a 17,000-lux fluorescent lamp
[2]Frequency at which MTF under G density is 0.5
[3]Measured after aged at 50° C. and a RH of 80%

While the invention has been described in detail and with reference to specific embodiments thereof, it will be apparent to one skilled in the art that various changes and modifications can be made therein without departing from the spirit and scope thereof.

What is claimed is:

1. A polymer mordant represented by the general formula (I):

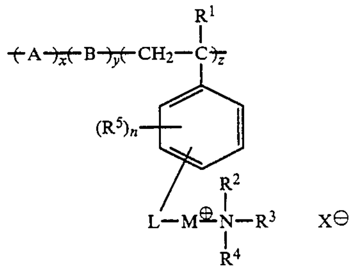

(I)

wherein A represents a monomer unit produced by copolymerization of copolymerizable monomers having at least two ethylenically unsaturated groups; B represents a monomer unit produced by copolymerization of copolymerizable ethylenically unsaturated monomers; $R^1$ represents a hydrogen atom or a $C_{1-6}$ alkyl group L represents $—CH_2O—$, $—CH_2N(R^6)—$,

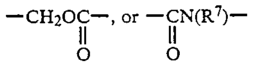

in which $R^6$ and $R^7$ each represents a hydrogen atom or an alkyl group; M represents

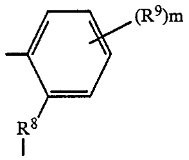

wherein $R^8$ represents an alkylene group having 1 to 6 carbon atoms; $R^9$ represents a $C_{1-20}$ alkyl group, a substituted $C_{1-20}$ alkyl group, a $C_{1-20}$ alkoxy group, a $C_{1-20}$ acylamino group, or a halogen atom,; and m represents an integer of 1 to 4; $R^2$, $R^3$ and $R^4$, which may be the same or different, each represents a $C_{1-20}$ alkyl group or a $C_{7-20}$ aralkyl group and at least two of $R^2$, $R^3$, and $R^4$ may be connected to each other to form a cyclic structure together with the nitrogen atom; $R^5$ represents a $C_{1-20}$ alkyl group, substituted $C_{1-20}$ alkoxy group, a $C_{1-20}$ acylamino group, or a halogen atom, $X^{\ominus}$ represents an anion; x represents 1.0 to 60 mol%; y represents 0 to 79 mol%; z represents 20 to 99 mol%; and n represents an integer of 0, 1, or 2;

wherein substituted $C_{1-20}$ alkyl groups represented by $R^2$, $R^3$, $R^4$, and $R^5$ are selected from the group consisting of an alkoxyalkyl group, a cyanoalkyl group, a halogenated alkyl group, an alkoxycarbonylalkyl group, and allyl group, a 2-butenyl group, and a propagyl group.

2. A polymer mordant as claimed in claim 1, wherein the copolymerizable monomers which may be copolymerized to form the monomers A having at least two ethylenically unsaturated groups are selected from the group consisting of divinylbenzene, ethylene glycol dimethacrylate, isopropylene glycol dimethacrylate, neopentyl glycol dimethacrylate, tetramethylene glycol diacrylate, and tetramethylene glycol dimethacrylate.

3. A polymer mordant as claimed in claim 1, wherein the $C_{1-20}$ alkyl group represented by $R^2$, $R^3$ or $R^4$ is selected from the group consisting of an unsubstituted alkyl group, an alkoxyalkyl group, a cyanoalkyl group, a halogenated alkyl group, an alkoxycarbonylalkyl group, an allyl group, a 2-butenyl group, and a propagyl group.

4. A polymer mordant as claimed in claim 1, wherein the $C_{7-20}$ aralkyl group represented by $R^2$, $R^3$, or $R^4$ is selected from the group consisting of an unsubstituted aralkyl group, an alkylaralkyl group, an alkoxyaralkyl group, a cyanoaralkyl group, a perfluoroalkoxyaralkyl group, and a halogenated aralkyl group.

5. A polymer mordant as claimed in claim 1, wherein said anion represented by $X^{\ominus}$ is slected from the group consisting of a halogen ion, an alkylsulfuric acid ion, an alkyl- or arylsulfuric acid ion, an acetic acid ion, and a sulfuric acid ion.

* * * * *